3,356,575
AUTOSTERILE INJECTABLE IODINATED OIL
X-RAY CONTRAST MEDIUM
Börje Torvald Arbaeus, Ove Birger Fernö, and Torsten Ove Enok Linderot, Halsingborg, Sweden, assignors to Aktiebolaget Leo (A/B Leo), Halsingborg, Sweden
No Drawing. Filed Apr. 13, 1965, Ser. No. 447,875
5 Claims. (Cl. 167—95)

The present invention relates to an X-ray contrast medium which is especially suitable for lymphography and is more particularly concerned with such a sterile composition containing an iodinated vegetable oil or iodinated ester of a vegetable oil, which is in a substantially anhydrous emulsion form and suitable for conversion into an aqueous emulsion for direct use by injection into a living animal body, and with a method of using the same.

Lymphography is proving to be an important diagnostic tool in determining disturbances of the lymphatic system. The method permits visualization of lymph nodes and lymph channels. It is particularly useful in studying the pelvis and retroperitoneal nodes, which were previously inaccessible to investigation. It is known to use iodinated vegetable oils, e.g., iodinated poppy seed oil, or the iodinated esters of vegetable oils. The oil is preferably injected directly into a lymph vessel which has been made visible by means of a subcutaneous injection of a nontoxic dyestuff, e.g., Evans blue or Patent blue. The iodinated oils have, however, certain drawbacks, e.g., they may cause pulmonary oil embolisms followed by dyspnea, increased pulse, and chest pains, as well as respiratory and/or cardiovascular collapse. In order to avoid these drawbacks, attempts have been made to use iodinated vegetable oils in a water emulsion. However, great technical difficulties have been encountered in producing a suitable emulsion. Thus, the iodinated oil droplets being from the beginning very small, tend to aggregate into larger ones upon storage, and the risk of embolism also exists after injection of such emulsions. Furthermore the iodinated oils as such are not stable substances and, in the presence of water, hydrolysis may occur with formation of free fatty acids and iodide. It is well known that the free fatty acids produce undesirable pharmacological effects and that the iodide may cause hypersensitivity reactions.

Another drawback of iodinated oil emulsions of prior types is the difficulty to obtain them in sterile form. Sterilization of the emulsions by heating is not possible due to decomposition of the iodinated oil and breakdown of the emulsion.

It is accordingly an object of the present invention to provide a stable substantially anhydrous emulsion containing an iodinated vegetable oil or iodinated ester of a vegetable oil, glycerol, and ethanol-soluble lecithin, which is not subject to the foregoing disadvantages or objections. It is a further object to provide such a composition which is autosterile and which is readily utilizable for injection upon dilution with sterile water, usually in the form of a physiologically acceptable isotonic solution. Another object is to provide a method of use of such composition for X-ray contrast purposes which involves injection thereof, after dilution with sterile water, into a living animal body. Other objects will become apparent hereinafter and still other objects will be apparent to one skilled in the art.

The contrast medium of the present invention is so composed and produced that the above-mentioned drawbacks are eliminated. The contrast medium is stored in the state of a waterfree or almost waterfree emulsion, in the following called the "basic emulsion." No more than the amount of water which is permitted in glycerol according to existing regulations (e.g., U.S. Pharmacopoeia) should be included in the basic emulsion. Said emulsion consists of an iodinated vegetable oil or an iodinated lower-alkyl ester of a vegetable oil together with glycerol and an ethanol-soluble lecithin as emulsifier. An amount of water up to about ten percent by weight of the glycerol, which amount is normally present therein, is permissible and introduces no harmful or undesirable result. It is of course difficult to prepare an absolutely waterfree glycerol, as it is highly hygroscopic, and to prepare an absolutely anhydrous glycerol would therefore be prohibitively expensive. Fortunately, this is not necessary.

The basic emulsion is produced as follows. The lecithin is dispersed in the glycerol by means of suitable dispersing equipment, e.g., an emulsifying machine of high speed rotating type. The iodinated oil is supplied to and mixed with the lecithin-glycerol dispersion in the above-mentioned equipment. The droplets of the basic emulsion have sizes up to about $0.5\mu$, mainly $0.1$–$0.5\mu$. When stored at a temperature of about $+4°$ C., the basic emulsion is stable and fit for use during at least twenty months.

After standing for three days, the composition is autosterile as further disclosed hereinafter. It is not satisfactorily autosterile unless both the glycerol and the iodinated oil or ester are present.

Prior to injection into a living animal body, the final emulsion is prepared by mixing and shaking the basic emulsion with a sterile isotonic water solution, e.g., a glucose or a sodium chloride solution. The emulsion thus prepared has a fineness and a stability which are entirely satisfactory for use according to the objects of the invention. The oil droplets of the final emulsion vary from a size of about $0.1\mu$ to about $0.5\mu$. Even with rather varying ratios between the basic emulsion and the water solution, the final emulsion stored at a temperature of about $+4$ to $+8°$ C. is unchanged and can be used during several weeks.

In order to obtain results acceptable from a diagnostic point of view, it has proved suitable when using the final emulsion according to the present invention that the proportions of the components lie within the following ranges:

Percent by weight
Glycerol _____ 30–75
Lecithin (ethanol-soluble) _____ 3–10
Iodinated vegetable oil or iodinated ester of
 vegetable oil _____ 20–65 and preferably between the following values: 40–60 percent, 4–8 percent and 35–55 percent respectively.

The iodinated oils utilized are iodinated vegetable oils or iodinated lower-alkyl esters of vegetable oils, in either case of conventional type. These are produced by iodinating vegetable oils or esters thereof having a relatively high iodine number, indicative of numerous double bonds, as is well known in the art. The usually employed iodinated vegetable oils or iodinated esters thereof ordinarily contain about thirty to fifty, preferably about forty, percent iodine by weight, again as is well known and conventional in this art.

The lecithin utilized as emulsifier must of course be non-toxic and therefore, from the standpoint of purity and non-toxicity, ethanol-soluble lecithin is employed.

The following examples are given by way of illustration only and are in no way to be construed as limiting.

*Example 1*

Percent by weight
Glycerol _____ 52
Lecithin (ethanol-soluble soy bean lecithin) _____ 8
Iodinated poppy seed oil _____ 40

The lecithin is dispersed in the glycerol by means of dispersing equipment whereafter the iodinated poppy seed oil is added and mixed with the lecithin-glycerol-dispersion in the above-mentioned equipment.

*Example 2*

| | Percent by weight |
|---|---|
| Glycerol | 45 |
| Lecithin (ethanol-soluble egg lecithin) | 10 |
| Iodinated ethyl ester of poppy seed oil | 45 |

The emulsion is prepared in the same manner as described above in Example 1.

*Example 3*

| | Percent by weight |
|---|---|
| Glycerol | 45 |
| Lecithin (ethanol-soluble soy bean lecithin) | 5 |
| Iodinated ethyl ester of poppy seed oil | 50 |

The emulsion is prepared in the same manner as described above in Example 1.

*Example 4*

| | Percent by weight |
|---|---|
| Glycerol | 50 |
| Lecithin (ethanol-soluble soy bean lecithin) | 5 |
| Iodinated sesame oil | 45 |

The emulsion is prepared in the same manner as described above in Example 1.

*Example 5*

The compositions of the preceding examples are duplicated using, as the iodinated oil, iodinated rape seed oil.

One of the advantages of the present invention is that the basic emulsion is made substantially anhydrous, whereby the risks of hydrolysis and iodide formation are avoided. Waterfree or substantially waterfree emulsions have earlier been made from vegetable oils but, to the best of our knowledge, substantially anhydrous emulsions of iodinated vegetable oils or iodinated lower-alkyl esters of vegetable oils have not heretofore been prepared. It is, moreover, surprising that an emulsion of this kind can be produced with iodinated oils, which have quite different chemical and physical characteristics, e.g., higher specific gravity, than vegetable oils.

Another advantage of conclusive significance is the surprising fact that the emulsion according to the present invention becomes sterile when stored for a few days, e.g., three days or more, at room temperature. It is known that iodinated oils have a certain bactericidal effect which for the purposes of this invention would be entirely inadequate. It is therefore quite surprising that an emulsion according to the present invention is autosterile, and all the more surprising because lecithin is known to counteract the effect of many bactericidal compounds.

*Example 6*

The sterilization action of the emulsions according to the present invention has been examined by means of detailed bacteriological tests.

Bouillon cultures of *Staphylococcus aureus*, *Escherichia coli*, *Pseudomonas pyocyaneus*, *Bacillus subtilis* and *Proteus vulgaris* were diluted as follows: 1:100, 1:1,000,000 and 1:100,000,000. From each of these solutions 0.05 ml. was placed into test tubes containing 2.5 ml. of the basic emulsion according to the invention. The tubes with the mixture were thoroughly shaken and then stored at a temperature of +4° C.

After 1½ hours, 2, 3, 4, 5 and 14 days, 0.1 ml. of the bacteria-emulsion mixture was added to test tubes with polysorbate 80 (polyoxyethylene sorbitan mono-oleate)-lecithin bouillon. The tubes were incubated at +37° C. After 1 and 3 days, a platinum loop of the mixture was transferred to blood agar plates, whereafter the plates were incubated at +37° C. for 24 hours.

TABLE 1

| | Basic emulsion stored at +4° C. is able within— | | | | | | | |
|---|---|---|---|---|---|---|---|---|
| | 1½ h. | | 24 h. | | 48 h. | | 72 h. | |
| | To kill (k) | Not to kill (nk) | k | nk | k | nk | k | nk |
| A. *Escherichia coli* | 240 | 1,700 | $1.7 \times 10^3$ | $2.4 \times 10^4$ | $1.7 \times 10^5$ | | | |
| B. *Proteus vulgaris* | 8 | 20 | $2.0 \times 10^5$ | | | | | |
| C. *Pseudomonas pyocyaneus* | 1,600 | 42,000 | $4.2 \times 10^4$ | $1.6 \times 10^5$ | $1.6 \times 10^5$ | | | |
| D. *Staphylococcus aureus* | 400 | 1,100 | $1.1 \times 10^5$ | $4.4 \times 10^4$ | | $4.4 \times 10^4$ | $4.4 \times 10^4$ | |
| E. *Bacillus subtilis* | 1,000 | | | | | | | |

These figures held true for all of the compositions of the invention tested.

As is seen from Table 1, the basic emulsion is able to kill all *Bacillus subtilis* within 1½ hours. After 24 hours all *Proteus vulgaris* are killed and after 48 hours all *Escherichia coli* and *Pseudomonas pyocyaneus*. After 72 hours the *Staphylococcus aureus* were also dead. The basic emulsion according to the invention has consequently a clear autosterilizing effect.

*Example 7*

In order to compare the effect of a conventional iodinated oil emulsion and an emulsion according to the invention, the following experiments were conducted.

The following emulsions were used for further bactericidal and fungicidal tests, the quantities of bacteria, quantities of emulsion, and all other conditions being the same in each test:

A = basic emulsion according to the invention diluted with distilled water (1:1).

B = iodinated oil, lecithin (according to the basic emulsion of the invention), but distilled water instead of glycerol and diluted with distilled water (1:1).

C = control.

D = lecithin, glycerol, and peanut oil, diluted 1:1 with distilled water.

To said emulsions were added different kinds of bacteria as well as *Candida albicans*.

TABLE 2

| | 72 h. | | | | 168 h. | | | |
|---|---|---|---|---|---|---|---|---|
| | A | B | C | D | A | B | C | D |
| *Staphylococcus aureus* | k | k | nk | k | k | k | nk | k |
| *Pseudomonas aeruginosa* | k | k | nk | k | k | k | nk | k |
| *Candida albicans* | k | nk | nk | nk | k | nk | nk | nk |

From the results of these tests, it is apparent that the emulsion B and composition D have a bactericidal effect against some selected test bacterias after 72 hours. The only emulsion which is effective against the resistant *Candida albicans* is the emulsion A according to the present invention. The effect is synergistic since neither of compositions B and D, which respectively contain iodinated oil and glycerol, are effective against the resistant *Candida albicans*.

*Example 8*

Both animal and clinical tests with the new X-ray medium according to the invention have been successfully completed. The following dilutions of the basic emulsion were employed:

| Basic emulsion | 1 part | 1 | 1 |
| Glucose solution (5.5 percent) | 1½ part | 1 | ½ |

The sterile water used for the final dilution of the emulsion just prior to use is usually in the form of an isotonic solution, e.g., glucose or sodium chloride solution, and the water content of the final aqueous emulsion is preferably between about fifteen and sixty percent by weight of the final emulsion.

In vitro studies of other proportions between the basic emulsion and the sterile isotonic solution were also conducted. Microscopic studies of said final emulsions mixed with serum and blood showed a good compatibility and stability especially with regard to the red blood corpuscles.

In such compositions, oil-soluble chlorophyll may be present as a further component, usually up to about two percent, preferably one percent, by weight of the basic emulsion. The presence of chlorophyll has been proved to be of great value due to the fact that lymph nodes and lymph channels are thereby made much more visible due to its characteristic green color.

The clinical studies have included lymphography in about forty patients. The results were very satisfactory; the visualization was excellent and the secondary effects insignificant. According to usual protocols, the dye was administered first subcutaneously in order to enable visualization of the lymph vessels and the emulsion injected shortly thereafter directly into the lymph vessel to be observed.

Pulmonary X-ray investigations were in no case positive, thus evidencing absence of the dangerous pulmonary oil embolisms.

The use of an emulsion according to the invention is, however, not limited to lymphography. Another area of use is hepatography, where iodinated oil emulsions or iodinated oil suspensions have already been used but abandoned for non-stability and other reasons. In such applications, chlorophyll should preferably not be present.

The high order of utility and suitability of the compositions of the present invention, as evidenced by tests in lower animals, is indicative of utility in human beings as well as in lower animals, as indicated by the foregoing reported results. Clinical evaluation in human beings has not been entirely completed, however. It will be clearly understood that the distribution and marketing of any composition of the present invention for use in human beings will of course have to be predicated upon prior approval by agencies, such as the U.S. Federal Food and Drug Administration, which are responsible for and authorized to pass judgment on such questions.

Various modifications and substitutions of equivalents will be apparent to one skilled in the art and may be made in the compounds, compositions, and method of the present invention without departing from the spirit or scope thereof, and it is therefore to be understood that the invention is to be limited only by the full scope which can be legally accorded the appended claims.

We claim:

1. An autosterile X-ray contrast medium in the form of a substantially anhydrous emulsion, useful for sterile injection upon dilution with sterile water, which contains (1) a member selected from the group consisting of an iodinated vegetable oil and an iodinated lower-alkyl ester of a vegetable oil, (2) glycerol, and (3) an ethanol-soluble lecithin as emulsifier wherein the ratios by weight of glycerol, ethanol-soluble lecithin, and iodinated vegetable material (1) are in the range between about 30:3:20 and 75:10:65.

2. An X-ray contrast medium of claim 1 wherein (1) is selected from the group consisting of iodinated poppy seed oil, iodinated sesame oil, and the iodinated ethyl ester of poppy seed oil.

3. An X-ray contrast medium of claim 1 wherein (3) is selected from the group consisting of soy bean lecithin and egg lecithin.

4. An X-ray contrast medium of claim 1 wherein the ratios by weight of glycerol, ethanol-soluble lecithin, and iodinated vegetable material (1) are in the range between about 40:4:35 and 60:8:55.

5. An X-ray contrast medium of claim 1, also including oil-soluble chlorophyll as a component thereof.

References Cited

UNITED STATES PATENTS

| 1,840,034 | 1/1932 | Hansen et al. | 167—95 |
| 1,870,023 | 8/1932 | Raiziss et al. | 167—95 |
| 2,972,565 | 2/1961 | Zilversmit | 167—66 |

FOREIGN PATENTS

| 517,425 | 1/1940 | Great Britain. |
| 948,407 | 2/1964 | Great Britain. |

OTHER REFERENCES

Hackh's Chemical Dictionary, The Blackiston Co., Philadelphia, Pa. (1944), pp. 194–195.

Wallingford: New York Academy of Sciences, vol. 78, art. 3, pp. 707–709 (July 2, 1959).

ALBERT T. MEYERS, *Primary Examiner.*

SAM ROSEN, *Examiner.*

V. C. CLARKE, *Assistant Examiner.*